US006376089B1

(12) United States Patent
Nishiuchi et al.

(10) Patent No.: US 6,376,089 B1
(45) Date of Patent: Apr. 23, 2002

(54) PROCESS FOR PRODUCING RARE EARTH METAL-BASED PERMANENT MAGNET HAVING CORROSION-RESISTANT FILM

(75) Inventors: Takeshi Nishiuchi; Atsushi Kikugawa; Fumiaki Kikui, all of Osaka (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 35 days.

(21) Appl. No.: 09/649,593

(22) Filed: Aug. 29, 2000

(30) Foreign Application Priority Data

Aug. 30, 1999 (JP) .......................................... 11-243473
Aug. 7, 2000 (JP) .......................................... 12-238587

(51) Int. Cl.$^7$ ............................ B32B 15/08; B05D 5/00

(52) U.S. Cl. .................... 428/457; 427/127; 427/372.2; 427/397.7; 428/446; 428/447; 428/450; 428/900; 428/926; 428/928

(58) Field of Search ................................ 428/457, 446, 428/447, 450, 900, 926, 928; 427/127, 372.2, 397.7; 526/194, 279, 10, 39, 43, 14

(56) References Cited

U.S. PATENT DOCUMENTS 5,840,375 A 11/1998 Katsumi et al. ............ 427/600
6,174,609 B1 * 1/2001 Katsumi et al. ............ 428/450
6,224,986 B1 * 5/2001 Minowa et al. ............. 428/450

FOREIGN PATENT DOCUMENTS

JP 59009101 1/1984

* cited by examiner

*Primary Examiner*—Robert R. Koehler
(74) *Attorney, Agent, or Firm*—Armstrong, Westerman & Hattori, LLP

(57) ABSTRACT

The present invention provides a process for producing a rare earth metal-based permanent magnet having, on its surface, a corrosion-resistant film containing inorganic fine particles having a specific average particle size and dispersed in a film phase formed from a silicon compound. In a heat treatment for forming a film by a hydrolyzing reaction and a thermally decomposing reaction of the silicon compound, followed by a polymerizing reaction, a stress is generated within the film by the shrinkage of the film. In the corrosion-resistant film formed by the producing process according to the present invention, however, such stress is dispersed by the presence of the inorganic fine particles and hence, the generation of physical defects such as cracks is inhibited. In addition, voids between the adjacent inorganic fine particles are filled with the film phase formed from the silicon compound and hence, the formed film is dense. Further, no alkali ions are contained in the film and hence, the film itself is excellent in corrosion resistance. Yet further, the film has an excellent close adhesion to the magnet achieved by an excellent reactivity with the surface of the magnet.

14 Claims, No Drawings

PROCESS FOR PRODUCING RARE EARTH METAL-BASED PERMANENT MAGNET HAVING CORROSION-RESISTANT FILM

BACKGROUND OF THE INVENTION

1. Field of the Invention

The present invention relates to a process for producing a rare earth metal-based permanent magnet having, on its surface, a thin and dense film having various characteristics required for use as a corrosion-resistant film.

2. Description of the Related Art

A rare earth metal-based permanent magnet such as an R—Fe—B based permanent magnet represented by an Nd—Fe—B based permanent magnet and an R—Fe—N based permanent magnet represented by an Sm—Fe—N based permanent magnet is made of a material rich in resource and inexpensive, and has a high magnetic characteristic, as compared with an Sm—Co based permanent magnet. Therefore, particularly, the R—Fe—B based permanent magnet is used at present in a variety of fields.

However, the rare earth metal-based permanent magnet is liable to be corroded by oxidation in the atmosphere, because it contains a highly reactive rare earth metal (R). When the rare earth metal-based permanent magnet is used without being subjected to any treatment, the corrosion of the magnet is advanced from its surface due to the presence of a small amount of acid, alkali and/or water to produce a rust, thereby bringing about the deterioration and dispersion of the magnetic characteristic. Further, when the magnet having the rust produced therein is incorporated into a device such as a magnetic circuit, there is a possibility that the rust is scattered to pollute surrounding parts or components.

With the forgoing in view, a process for forming a corrosion-resistant film on the surface of a rare earth metal-based permanent magnet has been examined hitherto. There are conventionally proposed processes, such as a process which involves applying a colloidal solution comprising water, an alcohol and inorganic fine particles ($SiO_2$) to the surface of a magnet, and heating and solidifying the colloidal solution (see Japanese Patent Application Laid-open No.63-301506), a process which involves immersing a magnet into a treating solution comprising an aqueous solution of an alkali silicate containing ultra-fine silica particles dispersed therein, or applying such treating solution to the magnet, and then heating the magnet having the treating solution applied thereto (see Japanese Patent Application Laid-open No.9-63833), and a process which involves immersing a magnet into a treating solution comprising an aqueous solution of an alkali silicate containing fine metal particles dispersed therein, or applying such treating solution to the magnet, and then heating the magnet having the treating solution applied thereto (see Japanese Patent Application Laid-open No.2000-182813).

In recent years, a reduction in size of parts has been advanced in electronic and appliance industries in which a rare earth metal-based permanent magnet is used. In correspondence to this, it is required that the magnet itself is reduced in size and cost. From such a background, the surface treatment of the magnet must be carried out at higher dimensional accuracy (a reduction in thickness of a film and an increase in corrosion resistance of a thin film), with an increase in effective volume of the magnet and at a low cost. The following characteristics are required for the corrosion-resistant film.

First, the film must be dense. This is because if the film is not dense, it is impossible to prevent the corrosion of the magnet and to reduce the thickness of the film. Secondly, even if the film is dense, any physical defects such as cracks should not exist in the film. If a physical defect exists in the film, water enters the magnet through the defective portion and as a result, the corrosion begins from the surface of the magnet. Thirdly, the film itself must be excellent in corrosion resistance. If the film is liable to be corroded, it is impossible to prevent the corrosion of the magnet. Further, the film must be excellent in close adhesion to the magnet. Even if the film itself is excellent in corrosion resistance and the like, if the film is liable to be easily peeled off from the surface of the magnet, it is impossible to prevent the corrosion of the magnet. Finally, to form a film having a high dimensional accuracy, the film may be thin, but must have a uniform thickness and must satisfactorily exhibit the above-described characteristics.

The film produced by the process described in Japanese Patent Application Laid-open No.63-301506 is no more than a film formed with the inorganic fine particles merely bound together. Therefore, a void exists between the adjacent inorganic fine particles in the film. For this reason, the film lacks in denseness. The film is poor in reactivity with the surface of the magnet. For this reason, the film does not have an excellent close adhesion to the magnet. In the process described in Japanese Patent Application Laid-open Nos.9-63833 and 2000-182813, the content of alkali ions in the film can be reduced by dispersing ultra-fine silica particles or fine metal particles into the aqueous solution of alkali silicate, thereby enhancing the corrosion resistance of the film itself. However, if the content of alkali ions is over-reduced, cracks are generated. Therefore, it is difficult to simultaneously achieve the enhancement in the corrosion resistance of the film and the inhibition of the generation of physical defects, resulting in a problem that if any one of these characteristics is preferentially achieved, the other characteristic is poor.

SUMMARY OF THE INVENTION

Accordingly, it is an object of the present invention to provide a process for producing a rare earth metal-based permanent magnet having, on its surface, a thin and dense film having various characteristics required for use as a corrosion-resistant film.

The present inventors have made various studies with the above respect in view and as a result, they have found that in a heat treatment for forming a film by a hydrolyzing reaction and a thermally decomposing reaction of a silicon compound, followed by a polymerizing reaction, a stress is generated within the film by the shrinkage of the film, but such stress can be dispersed by dispersing the inorganic fine particles having a specific average particle size into the film phase formed from the silicon compound, thereby inhibiting the generation of the physical defects such as cracks. It has been also found that the voids between the adjacent inorganic fine particles are filled with the film phase formed from the silicon compound and hence, the film is dense; that the film itself is excellent in corrosion resistance, because no alkali ions are contained in the film; and that the excellent close adhesion of the formed film is achieved by the excellent reactivity with the surface of the magnet. Further, it has been found that the characteristics of the formed film are associated with the characteristics of the treating solution used for the formation of the film, and the excellent film can be formed, particularly, by controlling the viscosity of the treating solution.

It is described in Japanese Patent Application Laid-open No.7-230906 that a solid powder such as silica is added to a mixture of a silica precursor component such as tetraethyl orthosilicate and an organic precursor component such as vinyltriethoxysilane to form a film. However, the film described in this Patent is a film containing the silica precursor component and the organic precursor component as requisite components, and is different from the technical idea of the present invention. In addition, the relevant of the formed film to the particle size of the solid powder and the relevant of the formed film to the treating solution used for forming the film are not described in any way.

The present invention has been accomplished with the above knowledge in view, and to achieve the above object, according to a first aspect and feature of the present invention, there is provided a process for producing a rare earth metal-based permanent magnet having a corrosion-resistant film, comprising the steps of applying, to the surface of a magnet, a treating solution containing a silicon compound having at least one hydroxyl group and/or at least one hydrolyzable group and inorganic fine particles having an average particle size in a range of 1 nm to 100 nm, and subjecting the magnet having the treating solution applied thereto to a heat treatment.

According to a second aspect and feature of the present invention, in addition to the first feature, the treating solution has a viscosity adjusted to 20 cP or less.

According to a third aspect and feature of the present invention, in addition to the second feature, the viscosity of the treating solution is adjusted to 20 cP or less by diluting the treating solution with an organic solvent having a vapor pressure of 1 mmHg or more at 20° C.

According to a fourth aspect and feature of the present invention, in addition to the first feature, the rare earth metal-based permanent magnet is an R—Fe—B based permanent magnet.

According to a fifth aspect and feature of the present invention, in addition to the first feature, the rare earth metal-based permanent magnet is an R—Fe—N based permanent magnet.

According to a sixth aspect and feature of the present invention, in addition to the first feature, the treating solution is a sol solution produced by a sol-gel reaction In which at least the silicon compound participates.

According to a seventh aspect and feature of the present invention, in addition to the first feature, the silicon compound is a compound represented by a general formula, $R^1{}_nSiX_{4-n}$ wherein $R^1$ is a lower alkyl group which may have a substituent group, a lower alkenyl group, or an aryl group which may have a substituent group; X is hydroxyl group or $OR^2$ (wherein $R^2$ is a lower alkyl group which may have a substituent group, an acyl group, an aryl group which may have a substituent group, or an alkoxyalkyl group); and n is an integer of 0 to 3.

According to an eighth aspect and feature of the present invention, in addition to the seventh feature, n in the general formula is an integer of 1 to 3.

According to a ninth aspect and feature of the present invention, in addition to the first feature, the inorganic fine particles are fine particles of a metal oxide comprising at least one selected from $SiO_2$, $Al_2O_3$, $ZrO_2$, $TiO_2$, MgO and $BaTiO_3$.

According to a tenth aspect and feature of the present invention, in addition to the ninth feature, the inorganic fine particles are fine particles of a metal oxide comprising $SiO_2$.

According to an eleventh aspect and feature of the present invention, in addition to the first feature, the blend ratio (weight ratio) of the silicon compound (in terms of $SiO_2$) to the inorganic fine particles in the treating solution is in a range of 1:0.01 to 1:100.

According to a twelfth aspect and feature of the present invention, in addition to the first feature, the thickness of the corrosion-resistant film is in a range of 0.01 $\mu$m to 10 $\mu$m.

According to a thirteenth aspect and feature of the present invention, there is provided a rare earth metal-based permanent magnet having, on its surface, a film containing inorganic fine particles having an average particle size in a range of 1 nm to 100 nm and dispersed in a film phase formed from a silicon compound having at least one hydroxyl group and/or at least one hydrolysable group.

According to a fourteenth aspect and feature of the present invention, in addition to the thirteenth feature, the magnet is produced by a producing process according to the first aspect and feature of the present invention.

With the process for producing the rare earth metal-based permanent magnet having the corrosion-resistant film according to the present invention, the corrosion-resistant film containing the inorganic fine particles having a specific average particle size and dispersed in the film phase formed from the silicon compound can be formed on the surface of the magnet. In a heat treatment for forming a film by a hydrolyzing reaction and a thermally decomposing reaction of a silicon compound, followed by a polymerizing reaction, a stress is generated within the film by the shrinkage of the film, but such stress is dispersed by the presence of the inorganic fine particles and hence, the generation of the physical defects such as cracks is inhibited. In addition, voids between the adjacent inorganic fine particles are filled with the film phase formed from the silicon compound and hence, the film is dense. Further, no alkali ions are contained in the film and hence, the film itself is excellent in corrosion resistance. Yet further, the film has an excellent close adhesion to the magnet achieved by an excellent reactivity with the surface of the magnet.

DETAILED DESCRIPTION OF THE INVENTION

A process for producing a rare earth metal-based permanent magnet having a corrosion-resistant film according to the present invention comprises the steps of applying, to the surface of a magnet, a treating solution containing a silicon compound having at least one hydroxyl group and/or at least one hydrolysable group and inorganic fine particles having an average particle size in a range of 1 nm to 100 nm, and subjecting the magnet having the treating solution applied thereto to a heat treatment.

The silicon compound having at least one hydroxyl group and/or at least one hydrolyzable group is particularly not limited, and may be any of the following silicon compounds (a), (b) and (c), if the silicon compound is capable of being homo-polymerized, or if the silicon compound is capable of being polymerized with inorganic fine particles, if the latter is polymerizable, which will be described hereinafter. For example, such compounds may be used alone or in the form of a mixture. These compounds can be prepared by a known process, and most of them are commercially available.

(a) A silicon compound represented by a general formula, $R^1{}_nSiX_{4-n}$ wherein $R^1$ is a lower alkyl group which may have a substituent group, a lower alkenyl group, or an aryl group which may have a substituent group; X is hydroxyl group or OR as a hydrolyzable group (wherein $R^2$ is a lower alkyl group which may have a substituent group, an acyl group, an aryl group which may have a substituent group, or an alkoxyalkyl group); and n is an integer of 0 to 3.

(b) A silicon compound represented by a general formula, $Z^1_{3-m}$—$Si(R^3)_m$—Y—$Si(R^4)_p$—$Z^2_{3-p}$ wherein $R^3$ and $R^4$ may be the same or different and are each a lower alkyl group which may have a substituent group, a lower alkenyl group, or an aryl group which may have a substituent group; $Z^1$ and $Z^2$ may be the same or different and are each hydroxyl group or $OR^5$ as a hydrolyzable group (wherein $R^5$ is a lower alkyl group which may have a substituent group, an acyl group, an aryl group which may have a substituent group, or an alkoxyalkyl group); Y is an alkylene group; m and p may be the same or different and are each an integer of 0 to 2.

(c) An oligomer (a trimer, a tetramer or the like) of the above-described compound It is desirable that among the above-described compounds, a compound with n in the general formula being an integer of 1 to 3, and a compound with m+p in the general formula being an integer of 1 to 4 are used. This is because the use of such a compound ensures that a stress generated within the film by the shrinkage of the film in the heat treatment for forming the film can be further dispersed, and the generation of cracks can be further inhibited. On the other hand, it is desirable that the number of hydroxyl groups and/or hydrolyzable groups of silicon compound is large in order to increase the degree of polymerization of the silicon compound for forming the dense film. Therefore, it is particularly desirable to use a compound with n in the general formula being equal to 1, and a compound with m+p in the general formula being equal to 1 or 2 in order to achieve the effective inhibition of the generation of cracks and the formation of a dense film simultaneously.

The term "the lower alkyl group which may have a substituent group" means an alkyl group which has 1 to 4 carbon atoms and which may have a substituent group. Particular examples of alkyl groups each having 1 to 4 carbon atoms are methyl, ethyl, propyl, butyl groups and the like. Examples of substituent groups are phenyl, amino, cyano, nitro, mercapto, halogen, hydroxyl, carbonyl, epoxy groups and the like. The term "the lower alkenyl group" means an alkenyl group having 2 to 4 carbon atoms, and particular examples of lower alkenyl groups are vinyl, allyl, 1-propenyl, 2-butenyl groups and the like. Examples of aryl groups each of which may have a substituent group are a phenyl group which may have a substituent group. Examples of substituent groups are a lower alkyl such as methyl, amino, cyano, nitro, mercapto, formyl, halogen, hydroxyl groups and the like. Examples of acyl groups are formyl, acetyl, propionyl, butyryl groups and the like. Examples of alkoxyalkyl groups are methoxymethyl, 2-methoxyethyl, ethoxymethyl, 2-ethoxyethyl, 4-ethoxybutyl groups and the like. Examples of alkylene groups are methylene, ethylene, trimethylene, tetramethylene groups and the like.

Examples of the inorganic fine particles used in the present invention are fine particles of a metal oxide comprising at least one selected from $SiO_2$, $Al_2O_3$, $ZrO_2$, $TiO_2$, MgO, $BaTiO_3$ and the like; fine particles of a metal comprising at least one selected from Fe, Co, Ni, Al, Cu and the like; fine particles of a metal nitride comprising at least one selected from AlN, TiN and the like; fine particles of a metal carbide comprising TiC and the like; and fine particles of a metal carbide nitride comprising TiCN and the like. These types of inorganic fine particles may be used alone or in the form of a mixture. The fine particles of the metal oxide and fine particles of the metal have hydroxyl groups on their surfaces in a usual service environment and hence, can be polymerized with the silicon compound having at least one hydroxyl group and/or at least one hydrolyzable group, or with one another, which is convenient. However, it is desirable to use fine particles of the metal oxide comprising at least one selected from $SiO_2$, $Al_2O_3$, $ZrO_2$, $TiO_2$, MgO and $BaTiO_3$, and particularly, fine particles of the metal oxide comprising $SiO_2$, from the viewpoints of ease to control the form of the hydroxyl group and ease to handle the fine particles.

In the present invention, inorganic fine particles having an average particle size in a range of 1 nm to 100 nm are used. The reason is as follows: If the average particle size is smaller than 1 nm, there is a possibility that a secondary agglomeration occurs in the treating solution, resulting in a difficulty to handle. On the other hand, if the average particle size is larger than 100 nm, there is a possibility that a good dispersibility is not achieved and for this reason, it is failed to form a film having an excellent corrosion resistance. The dispersion of a large number of fine particles having smaller particle sizes in the film ensures that the generation of cracks can be inhibited more effectively. Therefore, The average particle size of the inorganic fine particles is preferably in a range of 2 nm to 50 nm, and more preferably in a range of 3 nm to 30 nm.

The process for preparing the inorganic fine particles is particularly not limited, and the inorganic fine particles may be prepared by a known process. For example, the fine particles of the metal oxide comprising $SiO_2$ can be prepared by a liquid-phase process or a gas-phase process, but the fine particles prepared by the liquid-phase process are desirable from the viewpoints of the dispersibility of them in the treating solution, the polymerizing reactivity with the above-described silicon compound having at least one hydroxyl group and/or at least one hydrolyzable group and the ease to control the form of the hydroxyl group. Examples of the liquid-phase processes, which may be used, are a process for forming fine particles using a water glass as a starting material, which involves removing $Na_2O$ by an ion exchange and then adding an acid (a so-called colloidal silica preparing process), and a process for forming fine particles, which involves diluting a metal compound (alkoxide) with an alcohol, adding water and then adding an acid or an alkali (a so-called sol-gel process). To enhance the dispersibility in the treating solution, the surfaces of the fine particles may be improved by a known method.

It is desirable from the viewpoint of the ease to handle that the inorganic fine particles are used in a state in which they have been dispersed in a solvent. However, when the inorganic fine particles dispersed in water are used, there is a possibility that after mixing of inorganic fine particles dispersed in water with the silicon compound having at least one hydroxyl group and/or at least one hydrolyzable group, the hydrolyzing reaction and/or the polymerizing reaction of the silicon compound is started, thereby exerting an influence to the stability of the treating solution and in its turn, to the excellent film-forming property. Therefore, it is more desirable that the inorganic fine particles are dispersed in an organic solvent such as a lower alcohol. Particularly, the colloidal silica is produced in a state in which they have been dispersed in water, and hence, it is desirable that an organosilica sol produced using an organic solvent in place of water is used.

The treating solution containing the silicon compound having at least one hydroxyl group and/or at least one hydrolyzable group and the inorganic fine particles may be a solution produced only by mixing both the silicon compound and the inorganic fine particles using an organic solvent such as a lower alcohol, but it is desirable that a sol solution produced by a sol-gel reaction in which at least the silicon compound participates is used as a treating solution. This is because the stress generated within the film by shrinkage of the film during the heat treatment for forming the film can be further dispersed to further inhibit the generation of cracks, by allowing the sol-gel reaction in which at least the silicon compound participates to take place at the stage of the treating solution, thereby providing a colloidal state in which the silicon compound has been homo-polymerized, or the silicon compound and the inorganic fine particles have been co-polymerized or the inorganic fine particles have been homo-polymerized, if the inorganic fine particles are polymerizable.

The sol solution preparing process will be described below.

The sol solution is prepared by adding a silicon compound having at least one hydroxyl group and/or at least one hydrolyzable group, inorganic fine particles, water and an organic solvent, and if required, a catalyst, a stabilizer and the like.

The blend ratio (weight ratio) of the silicon compound having at least one hydroxyl group and/or at least one hydrolyzable group to the inorganic fine particles in the sol solution is desirable to be in a range of 1:0.01 to 1:100 (wherein the proportion of the silicon compound is in terms of $SiO_2$), and more desirable to be in a range 1 0.1 to 1:10. If the content of the inorganic fine particles is smaller than 1:0.01, there is a possibility that the proportion of presence of the inorganic fine particles in the film is smaller, thereby bringing about the generation of cracks. If the content of the inorganic fine particles is larger than 1:100, there is a possibility that the voids created between the adjacent inorganic fine particles are not filled sufficiently with the film phase formed from the silicon compound, and there is also a possibility that the reactivity with the surface of the magnet is poor, whereby an excellent close adhesion to the magnet cannot be ensured.

The total rate of the silicon compound having at least one hydroxyl group and/or at least one hydrolyzable group and the inorganic fine particles incorporated in the sol solution is desirable to be in a range of 1% by weight to 40% by weight (wherein the proportion of the silicon compound is in terms of $SiO_2$). If the total rate is lower than 1% by weight, it may be possibly required to increase the number of steps in order to form a film having a satisfactory performance. If the total rate exceeds 40% by weight, there is a possibility that an influence is exerted to the stability of the sol solution, thereby making it difficult to form a uniform film.

Water to be contained in the sol solution may be supplied directly, or indirectly using a chemical reaction, e.g., by utilizing water produced in an esterifying reaction of an alcohol with a carboxylic acid, if such alcohol is used as an organic solvent, or by utilizing water vapor in the atmosphere. The amount of water supplied is desirably to be 150 or less by molar ratio with respect to the silicon compound having at least one hydroxyl group and/or at least one hydrolyzable group. If the molar ratio exceeds 150, there is a possibility that an influence is exerted to the stability of the sol solution. In addition, there is a possibility that the corrosion of the magnet is brought about during the formation of a film, and that the pollution and deterioration of the sol solution due to the magnet components is brought about by the corrosion of the magnet.

The organic solvent is particularly not limited, and may be any solvent if it is capable of homogeneously dissolving all of the silicon compound having at least one hydroxyl group and/or at least one hydrolyzable group, the inorganic fine particles and water, which are components of the sol solution, and uniformly dispersing the resulting colloid. Examples of such organic solvents, which may be used, are a lower alcohol, of which ethanol is representative; a hydrocarbonic ether alcohol, of which ethylene glycol mono-alkyl ether is representative; an acetate of a hydrocarbonic ether alcohol, of which ethylene glycol mono-alkyl ether acetate is representative; an acetate of a lower alcohol, of which ethoxyethyl acetate and ethyl acetate are representative; a ketone, of which acetone is representative; a glycol such as ethylene glycol; an aromatic hydrocarbon such as toluene and xylene; and a halogenated hydrocarbon such as trichloromethane. However, it is desirable from the viewpoints of the safety during the treatment and the cost that lower alcohols such as ethanol, isopropyl alcohol, 1-butanol are used alone or in the form of a mixture in order to facilitate the formation of a thin film having a uniform thickness, as will be described hereinafter. The organic solvent may be an organic solvent used as a dispersant for the organo-silica sol.

The viscosity of the sol solution depends on the combination of components for the sol solution, but is desirable to be generally adjusted to 100 cP or less. This is because if the viscosity of the sol solution exceeds 100 cP, it is difficult to form a film having a uniform thickness, and there is a possibility that cracks are generated during the heat treatment. More preferably, the viscosity of the sol solution is adjusted to 20 cP or less. It is possible to easily form a film, which is thin, but has a uniform thickness, by adjusting the viscosity of the sol solution, as described above.

The adjustment of the viscosity of the sol solution may be carried out by regulating the amount of organic solvent added. In this case, one of the above-described organic solvents may be used, but desirably, an organic solvent having a vapor pressure of 1 mmHg or more at 20° C. is used. The reason is as follows: When an organic solvent having a vapor pressure lower than 1 mmHg is used, there is an increased tendency for the organic solvent to remain in a sol solution applied to the surface of a magnet, or in a film formed on the surface of the magnet, and there is a possibility that pinholes are produced in a film by rapid evaporation of the organic solvent during the heat treatment for forming the film, whereby it is difficult to form a film having an excellent corrosion resistance. When a dip coating process, which will be described hereinafter, is used as a process for applying the sol solution to the surface of the magnet, there is a possibility that the sol solution is not gelatinized quickly on the surface of the magnet, when the magnet is pulled up out of the sol solution. As a result, the sagging of the sol solution occurs to bring about the degradation of the dimensional accuracy of the formed film. When an organic solvent having a vapor pressure of 1 mmHg or more, the organic solvent is evaporated promptly and hence, such problem can be avoided.

The upper limit of the vapor pressure of the organic solvent used is preferable to be 300 mmHg or less at 20° C. If an organic solvent having a vapor pressure exceeding 300 mmHg is used, there is a possibility that the variation in concentration of a sol solution with the passage of time due to the evaporation of the organic solvent from the sol solution during the production of a film is increased, thereby making it difficult to stably form a film.

Examples of organic solvents desirable in the present invention and having a vapor pressure in a range of 1 mmHg to 300 mmHg at 20° C. are methanol (95), ethanol (44), isopropyl alcohol (32), 1-butanol (5.5), cyclohexane (100), ethylene glycol mono-methyl ether (6.2), ethylene glycol mono-ethyl ether (3.8), ethylacetate (74), acetone (180), toluene (22) and xylene (6) (wherein the numeral enclosed in parentheses indicate a vapor pressure in unit of mmHg at 20° C.). They may be used alone or in the form of a mixture.

The pH value of the sol solution is desirable to be in a range of 2 to 7. If the pH value is lower than 2, or exceeds 7, there is a possibility that the hydrolyzing reaction and the polymerizing reaction cannot be controlled in the preparation of a sol solution suitable for the formation of a film.

The time and temperature of the preparation of the sol solution depend on the combination of components contained in the sol solution, but usually, the time of the preparation is in a range of 1 minute to 72 hours, and the temperature of the preparation is in a range of 0° C. to 100° C.

If required, a catalyst may be added to the sol solution. Examples of catalysts are acids such as acetic acid, nitric acid, hydrochloric acid and the like. They may be used alone or in the form of a mixture. The appropriate amount of a catalyst added is defined by the hydrogen ion concentration of the sol solution prepared, and it is desirable that the catalyst is added, so that the pH value of the sol solution is in a range of 2 to 7.

If required, a stabilizer may be added to the sol solution in order to stabilize the sol solution. The stabilizer is selected properly in accordance with the chemical stability of the silicon compound having at least one hydroxyl group and/or at least one hydrolyzable group and the chemical stability of the inorganic fine particles. For example, an acidic ammonium fluoride or an ethylene diamine may be used as a compound for forming a complex together with silicon atom.

As described above, the treating solution containing the silicon compound having at least one hydroxyl group and/or at least one hydrolyzable group and the inorganic fine particles maybe a solution produced only by mixing both the silicon compound and the inorganic fine particles using an organic solvent such as a lower alcohol. Even if such a treating solution is used, if the treating solution is applied to the surface of a magnet and the magnet is subjected to the heat treatment by the process which will be described hereinafter, a film having an excellent corrosion resistance can be formed on the surface of the magnet by the thermally decomposing reaction of the silicon compound and the subsequent homo-polymerizing reaction of the silicon compound and the like. The blend ratio of the silicon compound to the inorganic fine particles in the treating solution, the total rate of the silicon compound and the inorganic fine particles incorporated in the treating solution, the organic solvent which can be used and the like may be based upon the contents of the description of the sol solution.

To apply the treating solution containing the silicon compound having at least one hydroxyl group and/or at least one hydrolyzable group and the inorganic fine particles to the surface of the magnet, a dip coating process, a spraying process, a spin-coating process and the like may be used.

The heat treatment after the application of the treating solution to the surface of the magnet requires a temperature enough to evaporate at least the organic solvent. For example, when ethanol is used as the organic solvent, 80° C. which is a boiling point of ethanol is required. On the other hand, in the case of a sintered magnet, if the heat treatment temperature exceeds 500° C., there is a possibility that the deterioration of the magnetic characteristic is brought about. Therefore, the heat treatment temperature is desirable to be in a range of 80° C. to 500° C., and more desirable to be in a range of 80° C. to 250° C. from the viewpoint of preventing the generation of cracks to the utmost during a cooling treatment subsequent to the heat treatment. In the case of a bonded magnet, the temperature condition for the heat treatment must be set taking the heat-resisting temperature of a used resin into consideration. For example, in the case of a bonded magnet made using an epoxy resin or a polyamide resin, the heat treatment temperature is desirable to be in a range of 80° C. to 200° C. with the heat-resisting temperatures of these resins taken into consideration. In usual, if the productivity is taken into consideration, the time of the heat treatment may be set in a range of 1 minute to 1 hour.

It is desirable that at least one rare earth element (R) selected from the group consisting of Nd, Pr, Dy, Ho, Tb, Sm or at least one rare earth element (R) selected from the group consisting of La, Ce, Gd, Er, Eu, Tm, Yb, Lu and Y is contained in a rare earth metal-based permanent magnet used in the present invention.

In usual, one of the above-described rare earth elements (R) suffices, but in practice, a mixture of two or more of the above-described rare earth elements (misch metal or didymium) may be used for the reason of an available convenience.

The content of R in an R—Fe—B based permanent magnet is desirable to be in a range of 10% by atom to 30% by atom of the composition. If the R content is lower than 10% by atom, the crystal structure is the same cubic crystal structure as α-Fe and for this reason, a high magnetic characteristic, particularly, a high coercive force (HcJ) is not obtained. On the other hand, if the R content exceeds 30% by atom, the content of an R-rich non-magnetic phase is increased, and the residual magnetic flux density (Br) is reduced, whereby a permanent magnet having an excellent characteristic is not produced.

The Fe content is desirable to be in a range of 65% by atom to 80% by atom. If the Fe content is lower than 65% by atom, the residual magnetic flux density (Br) is reduced. If the Fe content exceeds 80% by atom, a high coercive force (HcJ) is not obtained.

It is possible to improve the temperature characteristic without degradation of the magnetic characteristic of the produced magnet by substituting a portion of Fe with Co. However, if the amount of Co substituted exceeds 20% by atom of Fe, the magnetic characteristic is degraded and hence, such amount is not preferred. The amount of Co substituted in a range of 5% by atom to 15% by atom is desirable for providing a high magnetic flux density, because the residual magnetic flux density (Br) is increased, as compared with a case where a portion of Fe is not substituted.

The B content is desirable to be in a range of 2% by atom to 28% by atom. If the B content is lower than 2% by atom, a rhombohedral structure is a main phase, and a high coercive force (HcJ) is not obtained. If the B content exceeds 28% by atom, the content of a B-rich non-magnetic phase is increased, and the residual magnetic flux density (Br) is reduced, whereby a permanent magnet having an excellent characteristic is not produced.

To improve the manufacture of the magnet and to reduce the manufacture cost, at least one of 2.0% by weight or less of P and 2.0% by weight or less of S may be contained in a total amount of 2.0% by weight or less in the magnet. Further, the corrosion resistance of the magnet can be improved by substituting a portion of B with 30% by weight or less of carbon Further, the addition of at least one of Al, Ti, V, Cr, Mn, Bi, Nb, Ta, Mo, W, Sb, Ge, Sn, Zr, Ni, Si, Zn, Hf and Ga is effective for improving the coercive force and the rectangularity of a demagnetizing curve, and for improving the manufacture and reducing the manufacture cost. It is desirable that at least one of them is added in an amount within a range satisfying a condition that at least 0.9 T or more of Br is required in order to ensure that the maximum energy product (BH)max is equal to or larger than 159 $kJ/m^3$.

In addition to R, Fe and B, the R—Fe—B based permanent magnet may contain impurities inevitable for industrial production of the magnet.

The R—Fe—B based permanent magnets used in the present invention include a sintered magnet having a feature in that it includes a main phase comprising a compound having a tetragonal crystal structure with an average crystal grain size in a range of 1 μm to 80 μm, and 1% to 50% by volume of a non-magnetic phase (excluding an oxide phase). This sintered magnet shows HcJ≧80 kA/m, Br>0.4 T and (BH)max≧80 $kJ/m^3$, wherein the maximum value of (BH) max reaches 199 $kJ/m^3$ or more.

Further, examples of the R—Fe—B based permanent magnets other than the above-described permanent magnet are an anisotropic R—Fe—B based bonded magnet as described in Japanese Patent Application Laid-open No.9-92515, an Nd—Fe—B based nanocomposite magnet having a soft magnetic phase (e.g., α-Fe or $Fe_3B$) and a hard magnetic phase ($Nd_2Fe_{14}B$) as described in Japanese Patent Application Laid-open No.8-203714, a bonded magnet produced using an isotropic Nd—Fe—B based magnet powder (e.g., MQP-B (a trade name) made by MQI, Co.) made by a melt quenching process conventionally used broadly, and the like. Any of them is used in a state in which it has been formed into a predetermined shape using a binder such as an epoxy resin.

Examples of the R—Fe—N based permanent magnets are permanent magnets represented by $(Fe_{1-x}R_x)_{1-y}N_y$ (wherein $0.07 \leqq x \leqq 0.3$ and $0.001 \leqq y \leqq 0.2$) as described, for example, in Japanese Patent Publication No.5-82041.

According to the process for producing the rare earth metal-based permanent magnet having the corrosion-resistant film according to the present invention, it is possible to form a film containing inorganic fine particles having an average particle size in a range of 1 nm to 100 nm and dispersed in the film phase formed from the silicon compound on the surface of the magnet. The film is very small in thickness, but dense and strong in close adhesion to the magnet. Therefore, if the thickness is equal to or larger than 0.01 μm, a satisfactory corrosion resistance is obtained. The inorganic fine particles have an essentially low water-permeability and hence, the water-permeability of the film itself can be reduced by dispersing the inorganic fine particles in the formed film. This effect is associated with the thickness and exhibited particularly with a thin film having a thickness in a range of 1 μm to 5 μm. The upper limit of the thickness of a film capable of being produced according to the present invention is not limited. However, the producing process according to the present invention is suitable to produce a rare earth metal-based permanent magnet having a corrosion-resistant film having a thickness being equal to or smaller than 10 μm, more preferably, equal to or smaller than 5 μm, further preferably, equal to or smaller than 3 μm from the demand for a reduction in size of the magnet itself.

A further other film may be formed on the corrosion-resistant film according to the present invention. By employing such a configuration, the characteristic of the corrosion-resistant film can be enhanced, and a further functional property can be provided.

EXAMPLES

Example 1

A known cast ingot was pulverized and then subjected sequentially to a pressing, a sintering, a heat treatment and a surface working, thereby producing a sintered magnet having a size of 23 mm×10 mm×6 mm and a composition of 17Nd-1Pr-75Fe-7B, for example, as described in U.S. Pat. No. 4,770,723. This sintered magnet was subjected to tests which will be described below.

The magnet was subjected to a shot blasting and further to a degreasing using a solvent, thereby its surface was cleaned. A sol solution was prepared at a composition, a viscosity and a pH value shown in Table 1, using the following components: tetraethoxysilane as a silicon compound, fine particles of a metal oxide comprising $SiO_2$ produced by a gas-phase process and having an average particle size of 12 nm as inorganic fine particles, a mixture of nitric acid and acetic acid as a catalyst, water, and a mixture of ethanol and isopropyl alcohol as an organic solvent. The sol solution was applied to the surface of the magnet at a pulling rate shown in Table 2 by a dip coating process, and the magnet having the sol solution applied to its surface was subjected to a heat treatment under conditions shown in Table 2 to form a corrosion-resistant film.

The formed corrosion-resistant film had a thickness of 0.7 μm (as measured by observation of a broken face of the film by an electron microscope). The surface of the film was observed using an electron microscope and as a result, cracks were little observed. The magnet having the corrosion-resistant film was subjected to a corrosion resistance acceleration test by leaving it to stand under high-temperature and high-humidity conditions of a temperature of 80° C. and a relative humidity of 90%. The result showed that no rust was generated for 200 hours from the start of the test.

Consequently, the formed corrosion-resistant film had no problematic cracks generated during the heat treatment for forming the film; was thin but dense; was excellent in close adhesion to the magnet; was capable of withstanding, for a long time, the corrosion resistance acceleration test in which the magnet was left to stand under the high-temperature and high-humidity conditions; and sufficiently satisfied a required corrosion resistance.

Example 2

A sol solution was prepared at a composition, a viscosity and a pH value shown in Table 1, using the following components: tetraethoxysilane as a silicon compound, fine particles of a metal oxide comprising $Al_2O_3$ produced by a gas-phase process and having an average particle size of 13 nm as inorganic fine particles, a mixture of nitric acid and acetic acid as a catalyst, water, and a mixture of ethanol and isopropyl alcohol as an organic solvent. The sol solution was applied to the surface of the sintered magnet (produced and cleaned by the method described in Example 1) at a pulling rate shown in Table 2 by a dip coating process, and the magnet having the sol solution applied to its surface was subjected to a heat treatment under conditions shown in Table 2 to form a corrosion-resistant film.

The formed corrosion-resistant film had a thickness of 0.8 μm (as measured by observation of a broken face of the film by an electron microscope). The surface of the film was observed using an electron microscope and as a result, cracks were little observed. The magnet having the corrosion-resistant film was subjected to a corrosion resistance acceleration test similar to that described in Example 1. The result showed that no rust was generated for 200 hours from the start of the test.

Consequently, the formed corrosion-resistant film had no problematic cracks generated during the heat treatment for forming the film; was thin but dense; was excellent in close adhesion to the magnet; was capable of withstanding, for a long time, the corrosion resistance acceleration test in which the magnet was left to stand under the high-temperature and high-humidity conditions; and sufficiently satisfied a required corrosion resistance.

Example 3

A sol solution was prepared at a composition, a viscosity and a pH value shown in Table 1, using the following components: monomethyltriethoxysilane as a silicon compound, fine particles of a metal oxide comprising $SiO_2$ produced by a liquid-phase process and having an average particle size of 25 nm as inorganic fine particles (a dispersant: methanol), water, and isopropyl alcohol as an organic solvent. The sol solution was applied to the surface of the sintered magnet (produced and cleaned by the method described in Example 1) at a pulling rate shown in Table 2 by a dip coating process, and the magnet having the sol solution applied to its surface was subjected to a heat treatment under conditions shown in Table 2 to form a corrosion-resistant film.

The formed corrosion-resistant film had a thickness of 2.0 $\mu$m (as measured by observation of a broken face of the film by an electron microscope). The surface of the film was observed using an electron microscope and as a result, cracks were not observed at all. The magnet having the corrosion-resistant film was subjected to a corrosion resistance acceleration test similar to that described in Example 1. The result showed that no rust was generated for 350 hours from the start of the test.

Consequently, the formed corrosion-resistant film had no cracks generated during the heat treatment for forming the film; was thin but dense; was excellent in close adhesion to the magnet; was capable of withstanding, for a long time, the corrosion resistance acceleration test in which the magnet was left to stand under the high-temperature and high-humidity conditions; and sufficiently satisfied a required corrosion resistance.

TABLE 2

| | Pulling rate (cm/min) | Heat treatment |
|---|---|---|
| Example 1 | 10 | 200° C. × 20 min |
| Example 2 | 10 | 200° C. × 20 min |
| Example 3 | 5 | 200° C. × 20 min |

Comparitive Example 1

Fine particles of a metal oxide comprising $SiO_2$ prepared by a liquid-phase process and having an average particle size of 12 nm (a dispersant:water) were mixed in an aqueous solution containing water glass ($SiO_2/Na_2O$=5 (by molar ratio)) in an amount of 100 g/L in terms of $SiO_2$, so that a concentration of 5 g/L was provided, thereby preparing a treating solution. This treating solution was applied to the surface of the sintered magnet (produced and cleaned by the method described in Example 1) at a pulling rate of 10 cm/min by a dip coating process, and the magnet having the treating solution applied to its surface was subjected to a heat treatment under conditions of 200° C.×20 minutes to form a film.

The formed film had a thickness of 2.0 $\mu$m (as measured by observation of a broken face of the film by an electron microscope). The surface of the film was observed using an electron microscope and as a result, cracks were not observed at all. However, as a result of a corrosion resistance acceleration test carried out in the same manners as described in Example 1, a rust was generated after a lapse of 150 hours from the start of the test.

Consequently, the formed film had no cracks generated during the heat treatment for forming the film; but was incapable of withstanding, for a long time, the corrosion resistance acceleration test in which the magnet was left to stand under the high-temperature and high-humidity conditions; and did not satisfy a required corrosion resistance.

Comparative Example 2

An isopropyl alcohol solution containing 30% by weight of $SiO_2$ was sprayed onto the surface of the sintered magnet (produced and cleaned by the method described in Example 1), and the magnet having the solution sprayed on its surface was subjected to a heat treatment under conditions of 200° C.×20 minutes to form a film.

TABLE 1

| | | | Proportion of component incorporated (by molar ratio) | | | | | |
|---|---|---|---|---|---|---|---|---|
| | A(Note 1) | B(Note 2) | Si compound | Nitric acid | Acetic acid | Water | Viscosity (cP) | pH |
| Example 1 | 1:1 | 10 | 1 | 0.01 | 1.5 | 2.5 | 1.4 | 3.8 |
| Example 2 | 1:1 | 10 | 1 | 0.01 | 1.5 | 2.5 | 1.4 | 4.0 |
| Example 3 | 1:1 | 15 | 1 | — | — | 2.4 | 1~2 | 4.5 |

A(Note 1): Blend ratio of silicon compound to inorganic fine particles in sol solution (by weight ratio)
* Proportion of silicon compound is in terms of $SiO_2$
B(Note 2): Total rate (% by weight) of silicon compound and inorganic fine particles incorporated in sol solution
* Proportion of silicon compound is in terms of $SiO_2$ The formed film had a thickness of 2.0 $\mu$m (as measured by observation of a broken face of the film by an electron microscope). The surface of the film was observed using an electron microscope and as a result, a large number of cracks was observed. As a result of a corrosion resistance acceleration test carried out in the same manners as described in Example 1, a rust was generated after a lapse of 24 hours from the start of the test.

Consequently, the formed film had a large number of cracks generated during the heat treatment for forming the film; was not dense; was incapable of withstanding, for a long time, the corrosion resistance acceleration test in which the magnet was left to stand under the high-temperature and high-humidity conditions; and did not satisfy a required corrosion resistance.

Example 4

An epoxy resin was added in an amount of 2% by weight to an alloy powder made by a rapid solidification process and having an average particle size of 150 $\mu$m and a composition comprising 12% by atom of Nd, 77% by atom of Fe, 6% by atom of B and 5% by atom of Co, and they were kneaded. The resulting mixture was subjected to a compression molding under a pressure of 7 tons/cm$^2$ and then cured for 1 hour at 170° C., thereby producing a bonded magnet having a size of 30 mm×20 mm×8 mm. This bonded magnet was subjected to tests which will be described below.

A sol solution was prepared at a composition, a viscosity and a pH value shown in Table 3, using the following components: monomethyltriethoxysilane as a silicon compound, fine particles of a metal oxide comprising $SiO_2$ produced by a liquid-phase process and having an average particle size of 25 nm as inorganic fine particles (a dispersant:methanol), water, and isopropyl alcohol as an organic solvent. The sol solution was applied to the surface of the magnet at a pulling rate shown in Table 4 by a dip coating process, and the magnet having the sol solution applied to its surface was subjected to a heat treatment under conditions shown in Table 4 to form a corrosion-resistant film.

The formed corrosion-resistant film had a thickness of 2.5 $\mu$m (as measured by observation of a broken face of the film by an electron microscope). The surface of the film was observed using an electron microscope and as a result, cracks were not observed at all. The magnet having the corrosion-resistant film was subjected to a corrosion resistance acceleration test similar to that described in Example 1. The result showed that no rust was generated for 350 hours from the start of the test.

Consequently, the formed corrosion-resistant film had no cracks generated during the heat treatment for forming the film; was thin but dense; was excellent in close adhesion to the magnet; was capable of withstanding, for a long time, the corrosion resistance acceleration test in which the magnet was left to stand under the high-temperature and high-humidity conditions; and sufficiently satisfied a required corrosion resistance.

TABLE 3

| | | | Proportion of component incorporated (by molar ratio) | | | | | |
|---|---|---|---|---|---|---|---|---|
| | A(Note 1) | B(Note 2) | Si compound | Nitric acid | Acetic acid | Water | Viscosity (cP) | pH |
| Example 4 | 1:1 | 15 | 1 | — | — | 2.4 | 1~2 | 4.5 |

A(Note 1): Blend ratio of silicon compound to inorganic fine particles in sol solution (by weight ratio)
* Proportion of silicon compound is in terms of $SiO_2$
B(Note 2): Total rate (% by weight) of silicon compound and inorganic fine particles incorporated in sol solution
* Proportion of silicon compound is in terms of $SiO_2$

TABLE 4

| | Pulling rate (cm/min) | Heat treatment |
|---|---|---|
| Example 4 | 5 | 150° C. × 30 min |

Examples 5 to 8

A sol solution was prepared at a composition, a viscosity and a pH value shown in Table 5, using the following components: monomethyltriethoxysilane as a silicon compound, fine particles of a metal oxide comprising $SiO_2$ produced by a liquid-phase process and having an average particle size of 15 nm as inorganic fine particles (a dispersant:isopropyl alcohol), water, and isopropyl alcohol as an organic solvent. The sol solution was applied to the surface of the sintered magnet (produced and cleaned by the method described in Example 1) at a pulling rate shown in Table 6 by a dip coating process, and the magnet having the sol solution applied to its surface was subjected to a heat treatment under conditions shown in Table 6 to form a corrosion-resistant film. The thickness of the formed corrosion-resistant film and the result of a corrosion resistance acceleration test similar to that described in Example 1 are shown in Table 7.

Consequently, the formed corrosion-resistant film had no cracks generated during the heat treatment for forming the film; was thin but dense; was excellent in close adhesion to the magnet; was capable of withstanding, for a long time, the corrosion resistance acceleration test in which the magnet was left to stand under the high-temperature and high-humidity conditions; and sufficiently satisfied a required corrosion resistance.

TABLE 5

| | A(Note 1) | B(Note 2) | Proportion of component incorporated (by molar ratio) Si compound | Nitric acid | Acetic acid | Water | Viscosity (cP) | pH |
|---|---|---|---|---|---|---|---|---|
| Example 5 | 1:1 | 15 | 1 | — | — | 2.9 | 3.0 | 5.3 |
| Example 6 | 1:1 | 15 | 1 | — | — | 2.9 | 9.2 | 5.7 |
| Example 7 | 1:1 | 15 | 1 | — | — | 2.9 | 18.9 | 5.9 |
| Example 8 | 1:1 | 15 | 1 | — | — | 2.9 | 31.5 | 6.1 |

A(Note 1): Blend ratio of silicon compound to inorganic fine particles in sol solution (by weight ratio)
* Proportion of silicon compound is in terms of $SiO_2$
B(Note 2): Total rate (% by weight) of silicon compound and inorganic fine particles incorporated in sol solution
* Proportion of silicon compound is in terms of $SiO_2$

TABLE 6

| | Pulling rate (cm/min) | Heat treatment |
|---|---|---|
| Example 5 | 5 | 200° C. × 20 min |
| Example 6 | 1.5 | 200° C. × 20 min |
| Example 7 | 0.7 | 200° C. × 20 min |
| Example 8 | 0.2 | 200° C. × 20 min |

TABLE 7

| | Thickness of film ($\mu$m) | Result of corrosion resistance acceleration test |
|---|---|---|
| Example 5 | 2.7 | No rust generated for 350 hours from start of test |
| Example 6 | 3.1 | No rust generated for 350 hours from start of test |
| Example 7 | 3.3 | No rust generated for 350 hours from start of test |
| Example 8 | 4.1 | No rust generated for 350 hours from start of test |

Examples 9 and 10

A sol solution was prepared at a composition, a viscosity and a pH value shown in Table 9, using the following components: a silicon compound, inorganic fine particles and an organic solvent shown in Table 8, and water. The sol solution was applied to the surface of the sintered magnet (produced and cleaned by the method described in Example 1) at a pulling rate shown in Table 10 by a dip coating process, and the magnet having the sol solution applied to its surface was subjected to a heat treatment under conditions shown in Table 10 to form a corrosion-resistant film. The thickness of the formed corrosion-resistant film and the result of a corrosion resistance acceleration test similar to that described in Example 1 are shown in Table 11.

Consequently, the corrosion-resistant film formed in Example 9 had no cracks generated during the heat treatment for forming the film; was thin but dense; was excellent in close adhesion to the magnet; was capable of withstanding, for a long time, the corrosion resistance acceleration test in which the magnet was left to stand under the high-temperature and high-humidity conditions; and sufficiently satisfied a required corrosion resistance. The corrosion-resistant film formed in Example 10 had cracks little generated during the heat treatment for forming the film; was thin but dense; was excellent in close adhesion to the magnet; was capable of withstanding, for a long time, the corrosion resistance acceleration test in which the magnet was left to stand under the high-temperature and high-humidity conditions; and sufficiently satisfied a required corrosion resistance.

Comparative Example 3

An attempt was made to prepare a sol solution at a composition, a viscosity and a pH value shown In Table 9, using the following components: a silicon compound, inorganic fine particles and an organic solvent shown in Table 8, and water. However, the fine particles were settled because of an excessively large average particle size thereof and hence, it was failed to prepare a homogeneous sol solution. As a result, it was failed to form a film on the surface of the magnet.

TABLE 8

| | Si compound | Inorganic fine particles: Fine particles of metal oxide | Average particle size | Preparing process | Dispersant | Organic solvent |
|---|---|---|---|---|---|---|
| Example 9 | Monomethyltriethoxysilane | $SiO_2$ | 15 nm | Liquid-phase process | Ethylene glycol | Ethanol |
| Example 10 | Monomethyltriethoxysilane | $SiO_2$ | 85 nm | Liquid-phase process | Ethylene glycol | Ethanol |
| Comparative Example 3 | Monomethyltriethoxysilane | $SiO_2$ | 420 nm | Liquid-phase process | Not used | Ethanol |

TABLE 9

| | A(Note 1) | B(Note 2) | Proportion of component incorporated (by molar ratio) Si compound | Nitric acid | Acetic acid | Water | Viscosity (cP) | pH |
|---|---|---|---|---|---|---|---|---|
| Example 9 | 1:0.25 | 10 | 1 | — | — | 2.4 | 3.3 | 4.8 |
| Example 10 | 1:0.25 | 10 | 1 | — | — | 2.4 | 3.2 | 4.9 |
| Comparative Example 3 | 1:0.25 | 10 | 1 | — | — | 2.4 | — | — |

A(Note 1): Blend ratio of silicon compound to inorganic fine particles in sol solution (by weight ratio)
* Proportion of silicon compound is in terms of $SiO_2$
B(Note 2): Total rate (% by weight) of silicon compound and inorganic fine particles incorporated in sol solution
* Proportion of silicon compound is in terms of $SiO_2$

TABLE 10

| | Pulling rate (cm/min) | Heat treatment |
|---|---|---|
| Example 9 | 5 | 200° C. × 20 min |
| Example 10 | 5 | 200° C. × 20 min |
| Comparative Example 3 | — | — |

TABLE 11

| | Thickness of film (μm) | Result of corrosion resistance acceleration test |
|---|---|---|
| Example 9 | 1.7 | No rust generated for 300 hours from start of test |
| Example 10 | 1.6 | No rust generated for 200 hours from start of test |
| Comparative Example 3 | — | — |

What is claimed is:

1. A process for producing a rare earth metal-based permanent magnet having a corrosion-resistant film, comprising the steps of applying, to the surface of a magnet, a treating solution containing a silicon compound having at least one hydroxyl group and/or at least one hydrolyzable group and inorganic fine particles having an average particle size in a range of 1 nm to 100 nm, and subjecting the magnet having the treating solution applied thereto to a heat treatment.

2. A process according to claim 1, wherein said treating solution has a viscosity adjusted to 20 cP or less.

3. A process according to claim 2, wherein the viscosity of said treating solution is adjusted to 20 cP or less by diluting the treating solution with an organic solvent having a vapor pressure of 1 mmHg or more at 20° C.

4. A process according to claim 1, wherein said rare earth metal-based permanent magnet is an R—Fe—B based permanent magnet.

5. A process according to claim 1, wherein said rare earth metal-based permanent magnet is an R—Fe—N based permanent magnet.

6. A process according to claim 1, wherein said treating solution is a sol solution produced by a sol-gel reaction in which at least said silicon compound participates.

7. A process according to claim 1, wherein said silicon compound is a compound represented by a general formula, $R^1{}_nSiX_{4-n}$ wherein $R^1$ is a lower alkyl group which may have a substituent group, a lower alkenyl group, or an aryl group which may have a substituent group; X is hydroxyl group or $OR^2$ (wherein $R^2$ is a lower alkyl group which may have a substituent group, an acyl group, an aryl group which may have a substituent group, or an alkoxyalkyl group); and n is an integer of 0 to 3.

8. A process according to claim 7, wherein n in the general formula is an integer of 1 to 3.

9. A process according to claim 1, wherein said inorganic fine particles are fine particles of a metal oxide comprising at least one selected from $SiO_2$, $Al_2O_3$, $ZrO_2$, $TiO_2$, MgO and $BaTiO_3$.

10. A process according to claim 9, wherein said inorganic fine particles are fine particles of a metal oxide comprising $SiO_2$.

11. A process according to claim 1, wherein the blend ratio (weight ratio) of said silicon compound (in terms of $SiO_2$) to said inorganic fine particles in said treating solution is in a range of 1:0.01 to 1:100.

12. A process according to claim 1, wherein the thickness of said corrosion-resistant film is in a range of 0.01 μm to 10 μm.

13. A rare earth metal-based permanent magnet having, on its surface, a film containing inorganic fine particles having an average particle size in a range of 1 nm to 100 nm and dispersed in a film phase formed from a silicon compound having at least one hydroxyl group and/or at least one hydrolysable group.

14. A rare earth metal-based permanent magnet according to claim 13, wherein said magnet is produced by a producing process comprising the steps of applying, to the surface of a magnet, a treating solution containing a silicon compound having at least one hydroxyl group and/or at least one hydrolyzable group and inorganic fine particles having an average particle size in a range of 1 nm to 100 nm, and subjecting the magnet having the treating solution applied thereto to a heat treatment.

* * * * *